US009206746B2

(12) United States Patent
Djelassi (10) Patent No.: US 9,206,746 B2
(45) Date of Patent: Dec. 8, 2015

(54) METHOD OF CONTROLLING SPEED TRANSIENTS IN A TURBINE ENGINE

(75) Inventor: Cedrik Djelassi, Marolles en Hurepoix (FR)

(73) Assignee: SNECMA, Paris (FR)

( * ) Notice: Subject to any disclaimer, the term of this patent is extended or adjusted under 35 U.S.C. 154(b) by 778 days.

(21) Appl. No.: 13/540,144

(22) Filed: Jul. 2, 2012

(65) Prior Publication Data

US 2013/0008171 A1 Jan. 10, 2013

(30) Foreign Application Priority Data

Jul. 4, 2011 (FR) ...................................... 11 55998

(51) Int. Cl.
*F02C 9/28* (2006.01)
*F02C 9/32* (2006.01)
*F02K 1/17* (2006.01)
*F02C 9/26* (2006.01)

(52) U.S. Cl.
CPC ... *F02C 9/28* (2013.01); *F02C 9/32* (2013.01); *F02K 1/17* (2013.01); *F02C 9/26* (2013.01); *F05D 2270/04* (2013.01); *F05D 2270/042* (2013.01); *F05D 2270/101* (2013.01); *F05D 2270/304* (2013.01)

(58) Field of Classification Search
CPC .... F05D 2270/304; F05D 2270/02–2270/024; F05D 2270/042; F05D 2270/101; F02C 9/28; F02C 9/26; F02C 9/32; F02C 9/285; F02K 1/17
USPC ................. 60/243, 39.281; 244/182; 701/110
See application file for complete search history.

(56) References Cited

U.S. PATENT DOCUMENTS

| 4,171,613 | A | * | 10/1979 | Schmidt-Roedenbeck et al. ........................... 60/39.281 |
| 4,437,303 | A | * | 3/1984 | Cantwell .................... 60/39.281 |
| 4,453,378 | A | | 6/1984 | Zagranski et al. |
| 4,490,791 | A | * | 12/1984 | Morrison ........................ 701/100 |
| 4,651,518 | A | * | 3/1987 | McLaughlin et al. .......... 60/773 |
| 4,809,500 | A | * | 3/1989 | Roberts, Jr. ..................... 60/235 |

(Continued)

FOREIGN PATENT DOCUMENTS

| EP | 0 092 424 A2 | 10/1983 |
| EP | 0 092 426 A1 | 10/1983 |

(Continued)

OTHER PUBLICATIONS

French Preliminary Search Report issued Feb. 24, 2012. in French 1155998, filed Jul. 4, 2011 (with English Translation of Categories of Cited Documents).

*Primary Examiner* — Phutthiwat Wongwian
*Assistant Examiner* — Alain Chau
(74) *Attorney, Agent, or Firm* — Oblon, McClelland, Maier & Neustadt, L.L.P.

(57) ABSTRACT

A method of controlling an engine in which a fuel flow setpoint is determined is provided. The method includes implementing a steady speed regulation loop in which the fuel-flow-rate setpoint is determined as a function of a difference between a setpoint parameter that depends on the position of a control lever and an operating parameter of the engine; detecting an intended speed transient; and implementing a speed transient regulation loop in which the fuel-flow-rate setpoint is determined as a function of a difference between a speed of the engine and a speed setpoint varying over time with the speed trajectory as generated in predetermined manner, if a speed transient is detected.

10 Claims, 3 Drawing Sheets

(56) References Cited

U.S. PATENT DOCUMENTS

| | | | |
|---|---|---|---|
| 4,928,482 A * | 5/1990 | Pollak et al. | 60/792 |
| 4,995,232 A * | 2/1991 | Sutton | 60/243 |
| 5,046,923 A | 9/1991 | Parsons et al. | |
| 5,083,277 A * | 1/1992 | Shutler | 701/100 |
| 5,133,182 A * | 7/1992 | Marcos | 60/792 |
| 5,134,845 A * | 8/1992 | Romano | 60/39.281 |
| 5,361,579 A * | 11/1994 | Bachelder | 60/39.281 |
| 8,321,104 B2 * | 11/2012 | Mahmood | 701/60 |

FOREIGN PATENT DOCUMENTS

| | | |
|---|---|---|
| EP | 0 324 633 A2 | 7/1989 |
| GB | 2461925 A | 1/2010 |
| JP | 2004-245069 | 9/2004 |

* cited by examiner

METHOD OF CONTROLLING SPEED TRANSIENTS IN A TURBINE ENGINE

BACKGROUND OF THE INVENTION

The present invention relates to the general field of gas turbine aeroengines. It relates more particularly to controlling the rate at which fuel is injected into a turbine engine.

In an aeroengine, it is known to determine a fuel-flow-rate setpoint for application to a fuel metering unit of a turbine engine as a function of the difference between the speed of the engine and a setpoint speed that depends on the position of a control lever operable by the pilot. For this purpose, a regulation loop is implemented by an electronic control unit of the engine.

In order to protect the engine against the risk of pumping during speed changes, the regulation loop may include a stop, referred to as the C/P stop, which stop limits the maximum rate at which fuel can be injected. Under such conditions, the time required to accelerate or decelerate the engine depends directly on the pumping margin of the engine.

Thus, an old or worn engine will present an acceleration or deceleration time that is longer than a new engine. Furthermore, utilization conditions (atmospheric conditions, flight envelope, power takeoff, . . . ) have an influence on the acceleration or deceleration time. This leads to a lack of reproducibility in the time required to accelerate or decelerate a given engine, and also to a lack of conformity between a plurality of engines of the same type, and this can lead to thrust asymmetry when accelerating.

It is also known to protect an engine against the risk of pumping during speed transients by using a regulation loop based on complying with an acceleration setpoint. Documents U.S. Pat. No. 4,543,782 and US 2003/0094000 describe systems of that type. There likewise, it is not possible to ensure acceleration or deceleration times that are reproducible. Following a rate-of-change for the speed does not make it possible to catch up for any delay acquired at the beginning of a transient.

Document EP 0 324 633 describes a method of controlling a turbine engine in which a fuel-flow-rate setpoint is determined in particular by making use of a "GOVERNOR" loop based on a difference between a speed setpoint NLdat that depends on the position of the control lever and the actual speed NL, and of a loop "DECEL LOOP" based on a difference between a speed that follows a determined trajectory by integrating a slope setpoint NHdet(−) and the speed NH. A "highest win" type gate selects the value supplied by one or other of the "GOVERNOR" and "DECEL LOOP" loops.

In similar manner, in EP 0 092 426, one of the values supplied by the regulation loops is selected by a "lowest win" type gate.

Nevertheless, selecting a flow rate setpoint by means of a "lowest win" or a "highest win" type gate presents drawbacks with a speed setpoint that is based on following a trajectory. During a fast transient, the inertia that needs to be overcome in order to accelerate the turbine engine make it necessary, at a given speed, to inject fuel at a rate that is much greater than the rate needed for stabilizing the engine at the same speed. Under such circumstances, "lowest win" type selection logic leads to premature selection of the main loop, thereby truncating acceleration. This phenomenon leads to the acceleration time not being complied with and also to non-reproducibility between accelerations.

OBJECT AND SUMMARY OF THE INVENTION

The present invention thus has a main object of mitigating the above-mentioned drawbacks of the prior art.

This object is achieved by a method of controlling an engine in which a fuel-flow-rate setpoint is determined, the method comprising:

a step of implementing a steady speed regulation loop in which the fuel-flow-rate setpoint is determined as a function of a difference between a setpoint parameter that depends on the position of a control lever and an operating parameter of the engine.

The control method is remarkable in that it comprises:

a detection step of detecting an intended speed transient; and in response to said detection step, a step of implementing a speed transient regulation loop in which the fuel-flow-rate setpoint is determined as a function of a difference between a speed of the engine and a speed setpoint varying over time according to a speed trajectory as generated in predetermined manner.

The speed transient regulation loop is thus implemented during speed transients. Since this regulation loop is based on following a speed trajectory, it makes it possible to improve the reproducibility of acceleration and deceleration times.

The step of detecting an intended speed transient may comprise comparing a difference between the setpoint parameter and the operating parameter with a predetermined threshold.

The operating parameter (and the associated setpoint parameter) corresponds to a parameter having a value that is associated with the thrust from the engine. For example, it may be an engine speed. In another example, it may be an engine pressure ratio (EPR).

This provides a simple and effective manner for detecting an intended speed transient, before varying the speed.

In one implementation, the engine is a turbine engine having a low-pressure spool and a high-pressure spool. Under such circumstances, the above-mentioned speed may be the speed of the low-pressure spool or the speed of the high-pressure spool. In other words, the invention proposes causing the high-pressure spool or the low-pressure spool to follow the trajectory. Which one of these two solutions is selected may depend in particular on the bypass ratio of the engine.

For example, for an engine having a low bypass ratio, thrust is well represented by the flow rate of air through the high-pressure spool. Causing the speed of the high-pressure spool to follow the trajectory makes it possible to achieve good reproducibility for acceleration time.

Conversely, for an engine having a large bypass ratio, thrust is well represented by the flow rate of air through the low-pressure spool. Causing the speed of the low-pressure spool to follow the trajectory then makes it possible to achieve good reproducibility for the acceleration time.

The speed trajectory may be generated by integrating a predetermined setpoint for the rate-of-change of speed, which may be written as the dn/dt setpoint or as the ndot setpoint. This integration is initialized with the speed value that is current at the moment an intended transient is detected.

The speed transient regulation loop may include a class 2 corrector.

This makes it possible to ensure that the permanent speed error is zero, and thus that the acceleration time or deceleration time is predetermined.

The speed transient regulation loop may include a direct action corrector suitable for determining a correction magnitude representative of flow rate variation that corresponds to a speed variation complying with the speed trajectory.

Such a direct action corrector working in an open loop serves to improve the response of the loop without disturbing its settings or its stability.

The invention also provides a computer program including instructions for executing steps of a control method in accordance with the invention when said program is executed by a computer.

The program may make use of any programming language, and be in the form of source code, object code, or code intermediate between source code and object code, such as in a partially complied form, or in any other desirable form.

The invention also provides a data medium or a recording medium that is readable by a computer and that includes instructions of a computer program as mentioned above.

The above-mentioned recording medium may comprise any entity or device capable of storing the program. By way of example, the medium may be a storage medium such as a read-only memory (ROM), e.g. a compact disk (CD) ROM, or a microelectronic circuit ROM, or indeed magnetic recording means, e.g. a floppy disk or a hard disk.

Furthermore, the recording medium may correspond to a transmissible medium such as an electrical or optical signal, suitable for being conveyed via an electrical or optical cable, by radio, or by other means. The program of the invention may in particular be downloaded from an Internet type network.

Alternatively, the recording medium may correspond to an integrated circuit in which the program is incorporated, the circuit being adapted to execute or to be used in the execution of the method in question.

Finally, the invention provides an electronic control unit for an engine, the control unit having a memory including instructions of a computer program of the invention, and the invention also provides an engine fitted with such an electronic unit.

BRIEF DESCRIPTION OF THE DRAWINGS

Other characteristics and advantages of the present invention appear from the following description given with reference to the accompanying drawings that show an implementation having no limiting character. In the figures.

DETAILED DESCRIPTION OF AN IMPLEMENTATION

Figure 1:
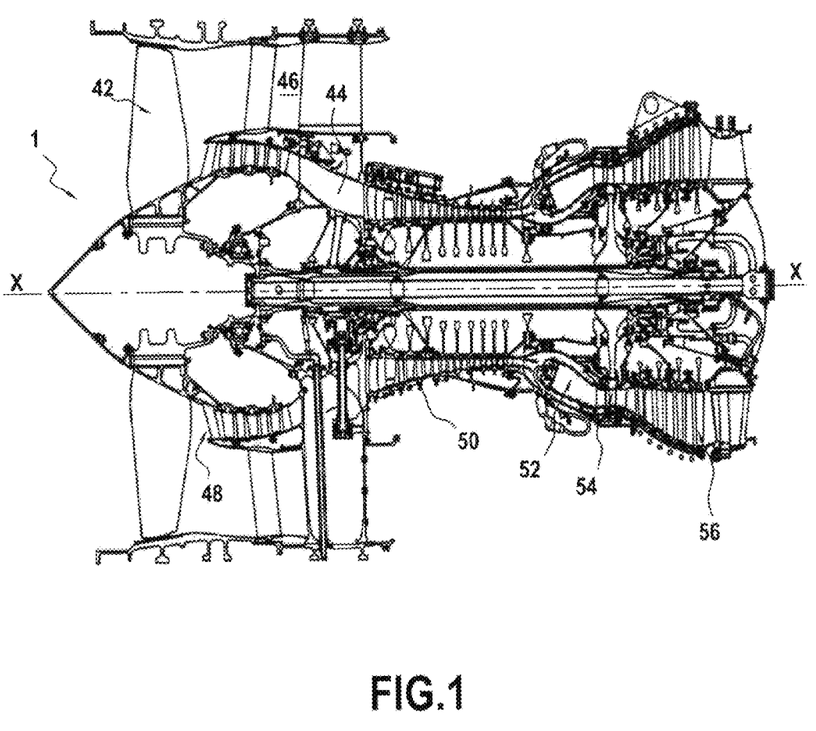
FIG. 1 is a diagrammatic and longitudinal section view of a portion of a gas turbine aeroengine in an embodiment of the invention.

FIG. 1 is a diagram of an engine 1 of the two-spool bypass turbojet type to which the invention applies in particular. Naturally, the invention is not limited to this particular type of gas turbine aeroengine.

In well-known manner, the engine 1 of longitudinal axis X-X comprises in particular a fan 42 that delivers a stream of air into a primary stream flow passage 44 and into a secondary stream flow passage 46 coaxially around the primary stream passage. From upstream to downstream in the flow direction of the gas stream passing therethrough, the primary stream flow passage 44 has a low-pressure compressor 48, a high-pressure compressor 50, a combustion chamber 52, a high-pressure turbine 54, and a low-pressure turbine 56.

Figure 3:
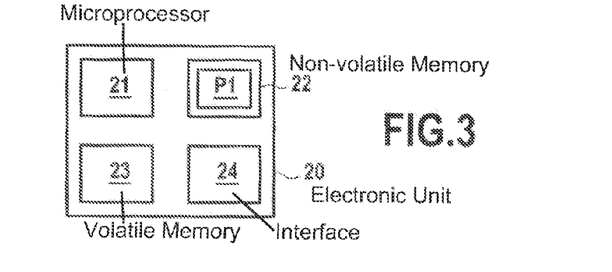
FIG. 3 is a diagram of an electronic control unit enabling the regulation loop of FIG. 2 to be used.

The operation of the engine 1 is controlled by an electronic unit 20, shown in FIG. 3. To this end, the electronic unit 20 obtains signals representing operating parameters of the engine 1, and in particular:

N1, the speed of rotation of the low-pressure compressor 48 and of the low-pressure turbine 56; and N2, the speed of rotation of the high-pressure compressor 50 and of the high-pressure turbine 54.

The electronic unit 20 determines a fuel-flow-rate setpoint written WF32C, and it controls the injection of fuel into the engine 1 as a function of the determined setpoint WF32C.

Figure 2:
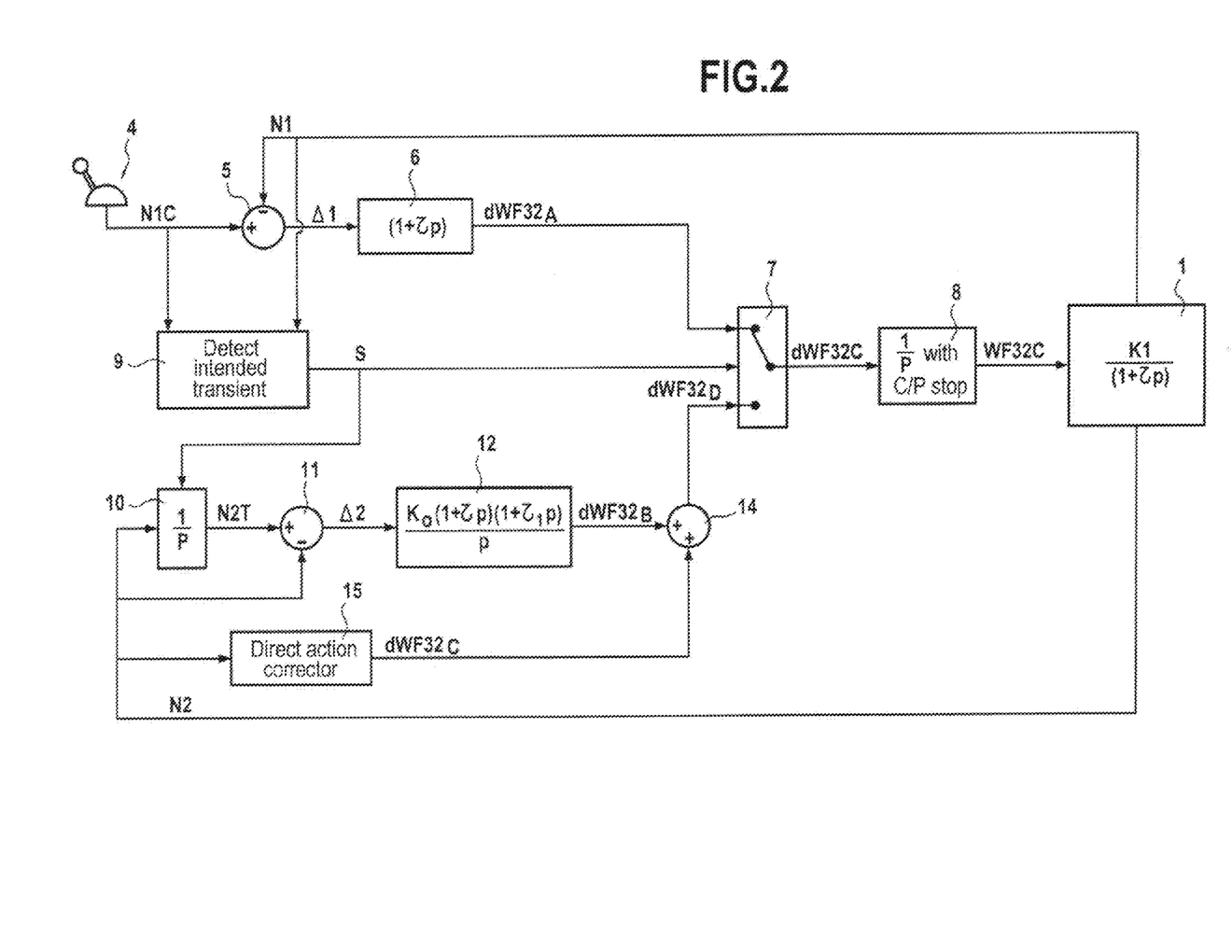
FIG. 2 is a diagram showing regulation loops used in an implementation of the invention.

FIG. 2 shows two regulation loops used by the electronic unit 20 in order to determine the fuel-flow-rate setpoint WF32C.

A regulation loop for steady conditions comprises in particular a summer module 5, a corrector network 6, a selector module 7, and an integrator module 8.

The summer module 5 determines a difference $\Delta 1$ between the speed N1 of the engine 1 and a setpoint speed N1C. The setpoint speed N1C is proportional to the position of a control lever 4 that is operable by the pilot.

The corrector network 6 provides a correction magnitude $dWF32_A$ to the selector module 7 as a function of the difference $\Delta 1$. The corrector network 6 may for example be a corrector of the filter type implementing a phase advance $(1+\tau p)$.

The selector module 7 selects the correction magnitude $dWF32_A$ or a correction magnitude $dWF32_D$ (described below) as a function of an activation signal S (described below).

When the regulation loop for steady conditions is implemented, the selector module 7 selects the correction magnitude $dWF32_A$. The selected correction magnitude, written dWF32C, is supplied to the integrator module 8.

The integrator module 8 determines the fuel-flow-rate setpoint WF32C by integrating the correction magnitude dWF32C. Furthermore, the integrator module 8 limits the maximum value of the fuel flow rate by implementing a stop, referred to as the C/P stop. This type of stop is known to the person skilled in the art and is not described in detail. It should be recalled that it may be expressed in the following form:

$$\frac{WF32}{Ps32\sqrt{T25/288.15}} = f(N2K, PT2)$$

In which equation:

WF32 represents the fuel flow rate;

Ps32 represents the static pressure in the combustion chamber;

T25 represents the total temperature at the outlet from the low-pressure compressor:

$N2K=N2\sqrt{T25/288.15}$ represents the reduced speed of the high-pressure spool; and PT2 represents the total pressure at the inlet to the fan.

The regulation loop for speed transients includes in particular a module 9 for detecting an intended transient, a module 10 for generating a speed trajectory, a summer module 11, a corrector network 12, a summer module 14, a direct action corrector 15, the selector module 7, and the integrator module 8.

The module 9 for detecting an intended transient serves to detect an intended transient as desired by the pilot.

When the control lever 4 remains in a constant position and the regulation loop for steady speed is used, the speed N1 of the engine 1 is steady and equal to the setpoint speed N1C.

If the pilot moves the control lever 4, the setpoint speed N1C varies immediately. In contrast, the speed N1 does not vary immediately because of the inertia of the engine 1 and because of the steady speed regulation loop.

Thus, the module 9 for detecting an intended transient detects that a transient is intended when the difference between the setpoint speed N1C and the speed N1 is greater than a predetermined threshold $S_1$:

N1C−N1>$S_1$ for an acceleration; and

N1−N1C>$S_1$ for a deceleration.

Below, the description continues with reference to an acceleration. However the invention also applies in corresponding manner for a deceleration transient.

The threshold $S_1$ is for example equal to 200 revolutions per minute (rpm).

When the above condition is satisfied, the module 9 for detecting an intended transient generates the activation signal S that is transmitted to the module 10 for generating a speed trajectory and to the selector module 7. In a variant embodiment, one or more additional conditions must be satisfied in order to generate the activation signal S. By way of example, the additional conditions involve deactivating the regulation loop for speed transients when certain limits are reached, e.g. the maximum acceptable speed of the engine 1 and/or an idling speed.

In response to receiving the activation signal S, the module 10 for generating a speed trajectory generates a speed trajectory, i.e. a time-varying speed setpoint, written N2T. By way of example, the setpoint N2T is generated by integrating a predetermined rate-of-change setpoint for the speed N2, referred to as the dn/dt setpoint or as the ndot setpoint. This integration is initialized at the speed value N2 that is current on receiving the activation signal S.

This predetermined slope is selected firstly to enable acceleration to take place over a length of time that is in compliance with the specifications for the engine 1, and secondly to be compatible with the maximum acceleration that is appropriate for the limitations that apply to an old engine (pumping limit).

In a discrete implementation, in which each value shown in FIG. 2 is calculated at regular time intervals, the setpoint N2T may for example be incremented on each time interval by a value dN2 corresponding to the predetermined slope for the trajectory.

The summer module 11 determines a difference Δ2 between the setpoint N2T and the speed N2 of the engine 1. The corrector network 12 provides a correction magnitude dWF32$_B$ as a function of the difference Δ2. An example of an implementation of the corrector network 12 is described in greater detail below.

In an implementation that is not shown, the correction magnitude dWF32$_B$ from the corrector network 12 is supplied directly to the selector module 7. In the implementation shown, the summer module 14 begins by calculating the sum dWF32$_D$ of the correction magnitude dWF32$_B$ plus a correction magnitude dWF32$_C$ determined by the direct action corrector 15, an example of which is described below.

In the implementation of FIG. 2, the setpoint trajectory N2T is a trajectory for the speed N2 of the high-pressure spool. In a variant that is not shown, the setpoint trajectory is a trajectory for the speed N1 of the low-pressure spool. The speed taken into account for calculating the difference Δ2 in this example is the speed N1.

When the activation signal S is not received, the selector module 7 selects the correction magnitude dWF32$_A$ and thus supplies the correction magnitude dWF32C that is equal to dWF32$_A$. In other words, the regulation loop for steady speed is activated.

When the activation signal S is received, the selector module 7 selects the correction magnitude dWF32$_D$ (or dWF32$_B$ in the absence of the direct action corrector 15) and thus supplies the correction magnitude dWF32c that is equal to dWF32$_D$ (or dWF32$_B$). In other words the speed transient regulation loop is activated.

In an implementation that is not shown, the selector module 7 also receives correction magnitudes supplied by other regulation loops. The person skilled in the art is aware of several regulation loops that can be implemented for regulating a turbine engine. Under such circumstances, when the activation signal S is received, the selector module 7 selects the corrector magnitude dWF32$_D$ (or dWF32$_B$) as before, and when it does not receive the activation signal S, the selector module 7 selects the correction magnitude dWF32$_A$ or one of the other correction magnitudes depending on a selection criteria, for example it selects the smallest correction magnitude.

The system shown in FIG. 2 operates as follows.

It is assumed that initially the control lever 4 is in a stationary position and the speed N1 of the engine 1 is steady and equal to N1C. The condition N1C−N1>$S_1$ is not satisfied so the module 9 for detecting an intended transient does not generate the activation signal S. The selector module 7 therefore selects the correction magnitude dWF32$_A$. In other words, the steady speed regulation loop is used. As explained above, the steady speed regulation loop has the effect of keeping the speed N1 equal to the setpoint speed N1C.

It is then assumed that the pilot moves the control lever 4 in order to request an acceleration. As explained above, the setpoint speed N1C increases instantly, whereas the speed N1 does not change immediately. The condition N1C−N1>$S_1$ is therefore satisfied and the module 9 for detecting an intended transient generates the activation signal S.

In response to the activation signal S, the selector module 7 selects the correction magnitude dWF32$_D$ (or dWF32$_B$). In other words, the speed transient regulation loop is implemented. This regulation loop is designed to ensure a constant acceleration time in the event of a speed transient.

In response to the activation signal S, the module 10 for generating a speed trajectory generates a setpoint N2T that varies over time to correspond to a trajectory that is generated in predetermined manner. By means of the actions of the summer module 11 and the corrector network 12, the speed N2 of the engine 1 tends to follow the trajectory that is imposed by the setpoint N2T. Thus, under normal circumstances, the engine 1 accelerates in compliance with the trajectory imposed by the module 10 for generating a speed trajectory. Activation of the speed transient regulation loop thus serves to ensure an acceleration time that is constant.

Because of the acceleration, the speed N1 approaches the speed setpoint N1C corresponding to the position of the control lever. Under such circumstances, the module 9 for detecting an intended transient detects that the condition N1C−N1>$S_1$ is not satisfied. The module 9 for detecting an intended speed transient therefore ceases to generate the activation signal S, and the selector module 7 selects the correction magnitude dWF32$_A$. In other words, the module 9 for detecting an intended transient also acts as a module for detecting the end of a transient. The transient speed regulation loop is implemented in response to detecting that a transient is intended, and it comes to an end in response to detecting the end of the transient.

In this example, the same threshold S1 is used both for detecting an intended transient and for detecting the end of the transient. In a variant, two different thresholds could be used. For example, the threshold may depend on the speed. Also in a variant, the module 9 for detecting an intended transient may present hysteresis so as to avoid switching the activation signal S too frequently during the stabilization stage.

At the end of transient, the modules 7 and 9 provide a transition between the speed transient regulation loop and the stabilized regulation loop that is accurate and fast. This makes it possible quickly to reduce the flow rate of fuel so as to stabilize the engine rapidly.

In special circumstances, for example with an old engine 1 having a pumping limit that is incompatible with the predetermined slope used for generating the speed trajectory, the C/P stop of the integrator module 8 may be reached. Under such circumstances, the speed N2 of the engine 1 does not follow the generated trajectory exactly, but approaches it as closely as possible, taking account of the pumping margin of the engine 1.

Thus, in general, the system of FIG. 2 serves to improve the reproducibility of the acceleration time for a given engine and for a plurality of engines of the same type.

Naturally, the same advantages are obtained when decelerating.

In one implementation, the functional modules of FIG. 2 (i.e. the summer module 5, the corrector network 6, the selector module 7, the integrator module 8, the module 9 for detecting an intended transient, the module 10 for generating a speed trajectory, the summer module 11, the corrector module 12, the summer module 14, and the direct action corrector 15) correspond to the electronic unit 20 executing a computer program.

An example of an electronic unit 20 is shown in FIG. 3. The electronic unit 20 presents the hardware architecture of a computer and comprises in particular a microprocessor 21, a non-volatile memory 22, a volatile memory 23, and an interface 24. The microprocessor 21 serves to execute computer programs stored in the non-volatile memory 22, while making use of the volatile memory 23. The interface 24 enables measurement signals to be obtained and control signals to be issued.

The non-volatile memory 22 includes in particular a computer program P1 that, on being executed, corresponds to implementing a control method in accordance with an implementation of the invention.

During execution of the computer program P1, the interface 24 enables measurement signals to be obtained representing the speeds N1 and N2 and the setpoint speed N1C, and enables a control signal to be issued representing the fuel-flow-rate setpoint WF32C.

As an alternative to the embodiment shown in FIG. 3, at least some of the functional modules of FIG. 2 may correspond to hardware circuits, e.g. programmable logic circuits.

There follows a description of an implementation of the corrector network 12. In this preferred implementation, the corrector network 12 presents a transfer function that may be expressed as follows:

$$C12(p) = \frac{K0(1+\tau p)(1+\tau_1 p)}{p}$$

Such a transfer function presents several advantages, as explained below.

The speed transient regulation loop may be characterized essentially by the transfer function of the engine 1, written H(p), and by the transfer function of the corrector constituted by the corrector network 12 and by the integrator module 8, written C(p). The open loop transfer function (OLTF) of the system may then be written as follows:

$$C(p)H(p) = \frac{K01 + a \cdot p + b \cdot p^2 + \ldots}{p^n 1 + c \cdot p + d \cdot p^2 + \ldots} = \frac{K0}{p^n} T(p)$$

Where the parameter n represents the class of the system.

The permanent speed error of the system in a closed loop, written $\epsilon_v$, may be expressed as follows:

$$\varepsilon_v(\infty) = \lim_{p \to 0} \frac{1}{p} \cdot \frac{1}{1 + \frac{K0}{p^n}} = \lim_{p \to 0} \frac{p^{n-1}}{K0}$$

It can be seen that for a system of class 0 (n=0), the permanent speed error $\epsilon_v$ is infinite. For a system of class 1 (n=1), the permanent speed error $\epsilon_v$ is equal to 1/K0. For a system of class 2 (n=2), the permanent speed error $\epsilon_v$ is zero.

The setpoint delivered by the module 10 for generating a speed trajectory may be considered as being a ramp, so it can be seen that an open loop system of class 2 (n=2) serves to provide a permanent speed error of zero, and thus an acceleration time that is predetermined.

This gives:

$$C(p)H(p) = \frac{K0}{p^2} T(p)$$

However, the engine 1 may be considered as a lowpass system of order 1 for which the transfer function may be expressed as follows:

$$H(p) = \frac{K1}{(1+\tau p)}$$

This gives:

$$C(p)H(p) = \frac{K01 + a \cdot p + b \cdot p^2 + \ldots}{p^2 1 + c \cdot p + d \cdot p^2 + \ldots} \frac{K1}{(1+\tau p)}$$

and thus:

$$C(p) = \frac{K01 + a \cdot p + b \cdot p^2 + \ldots}{p^2 1 + c \cdot p + d \cdot p^2 + \ldots}$$

In other words, a corrector that presents two pure integrators serves to ensure a permanent speed error of zero. Since the integrator module 8 already presents one pure integrator, the transfer function C12(p) of the corrector network 12 presents a second integrator.

In the above expression for the open loop transfer function, the values of the coefficients K0, a, b, c, d, ... may be selected for example so as to compensate the gain and the stable poles of the system.

Thus, in order to obtain unity gain, it is possible to select K0=1/K1.

In order to compensate the stable pole of the denominator (1+τp), it is possible to select a first-order phase advance corrector having the same cutoff frequency.

These choices lead to the following open loop transfer function:

$$C(p)H(p) = \frac{K0}{p^2} \cdot (1+\tau p) \cdot \frac{K1}{(1+\tau p)} = \frac{1}{p^2}$$

This corresponds to the following closed loop transfer function CLTF:

$$FTBF = \frac{1}{1+p^2}$$

FTBF=CLTF

An analysis of the Bode diagrams for the system shows that the presence of two pure integrators in the transfer function gives rise to a reduction in the phase margin and thus to destabilization of the closed loop transfer function.

In order to limit this problem, a phase advance corrector is included with a cutoff frequency close to:

1/τ:(1+τ1.p)

This therefore conserves the effect of two pure integrators at low frequency, and the action is canceled at higher frequency.

The transfer function of the corrector network may then be written as follows:

$$C(p) = \frac{K0}{p^2} \cdot (1+\tau p) \cdot (1+\tau 1 \cdot p)$$

It can be seen that this is a transfer function of the proportional-integral, proportional-integral (PI-PI) type.

Thus, it is assumed that the engine 1 is a first-order lowpass system. This approximation is satisfactory providing a pure delay is added thereto:

$$H(p) = e^{-Tr \cdot p} \frac{K1}{(1+\tau p)}$$

By taking this pure delay into account together with the corrector having a phase advance (1+τ1.p) when modeling the system, it is found that the gain margin and the phase margin of the system are preserved. In other words, it is ensured that the system is stable.

To summarize, the corrector network 12 having the above specified transfer function C12(p), which corresponds to a corrector having a transfer function C(p) of the proportional-integral, proportional-integral (PI-PI) type given that the integrator module 8 already has a pure integrator, makes it possible to eliminate the permanent speed error, to compensate the gain and the stable pole of the open loop transfer function, and to ensure that the system is stable.

Figure 4:
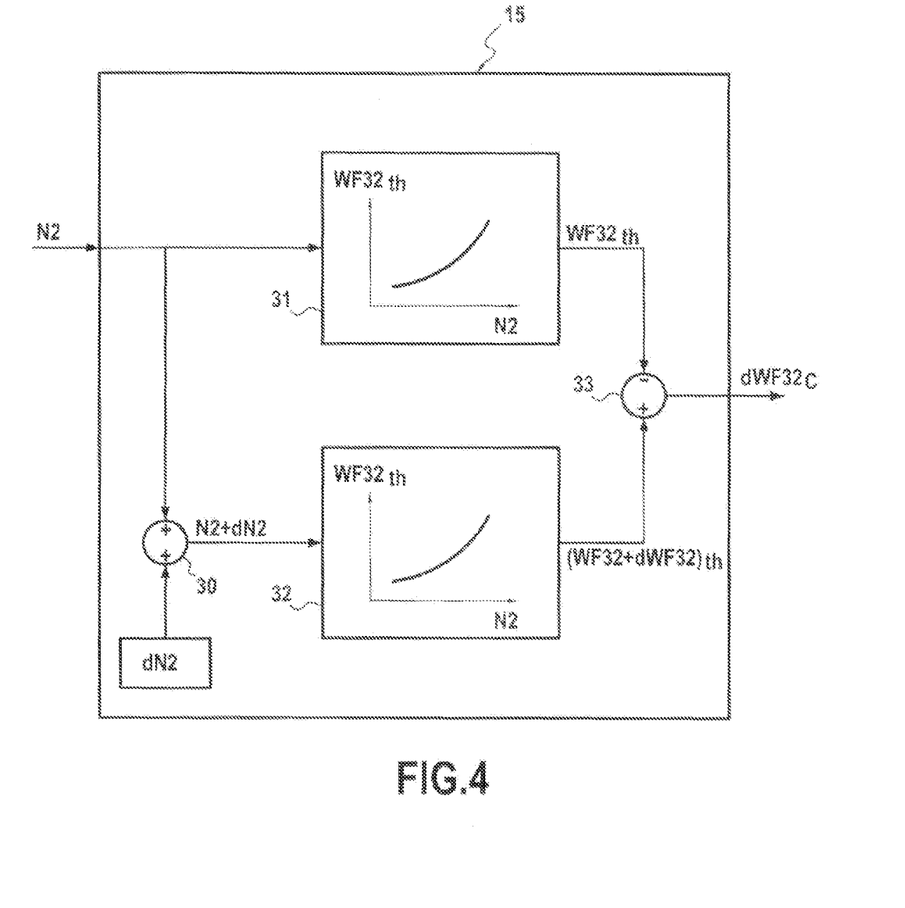
FIG. 4 is a diagram showing an example of the direct action corrector of FIG. 2.

With reference to FIG. 4, there follows a description of an implementation of the direct action corrector 15. The direct action corrector 15 comprises a summer module 30, a converter module 31, a converter module 32, and a summer module 33.

For a given engine, it is possible to model the transfer function between the fuel flow rate needed at steady speed for a given speed. This transfer relationship depends on several parameters (altitude, outside temperature, Mach number, ... ). The converter modules 31 and 32 are the result of inverting that transfer relationship.

Thus, the converter module 31 provides the theoretical stabilized fuel flow rate, written $WF32_{th}$, and corresponding to the speed N2.

The summer module 30 calculates the sum of the speed N2 plus the value dN2 mentioned above with reference to the operation of the module 10 for generating a setpoint trajectory. The sum N2+dN2 is supplied to the converter module 32 that therefore supplies the theoretical stabilized fuel flow rate, written $(WF32+dWF32)_{th}$, corresponding to the speed N2+dN2.

The summer module 33 calculates the difference between $(WF32+dWF32)_{th}$ and $WF32_{th}$, and it supplies the above-mentioned correction magnitude $dWF32_C$. The correction magnitude $dWF32_C$ corresponds to the increase in the flow rate that makes a speed increase dN2 possible. Thus, by adding the correction magnitude $dWF32_C$ to the correction magnitude $dWF32_B$ supplied by the corrector network 12, the response time and the stability of the second regulation loop are improved. Since the direct action corrector 15 operates in an open loop, it does not disturb the settings and the stability of the corrector formed by the corrector network 12 and the integrator module 8.

The invention is described above with reference to an aeroengine. Nevertheless, the invention is also applicable to controlling the flow rate of fuel in other types of engine, for example in an industrial turbine engine.

What is claimed is:

1. A method of controlling an engine in which a fuel flow setpoint is determined, the method comprising:
implementing a steady speed regulation loop in which the fuel-flow-rate setpoint is determined as a function of a difference between a setpoint parameter that depends on the position of a control lever and an operating parameter of the engine;
detecting an intended speed transient, comprising comparing a difference between said setpoint parameter and said operating parameter with a predetermined threshold, said intended speed transient being detected when said difference is greater than said predetermined threshold;
implementing a speed transient regulation loop in which the fuel-flow-rate setpoint is determined as a function of a difference between a speed of the engine and a speed setpoint varying over time according to a speed trajectory as generated by integrating a predetermined setpoint for the rate-of-change of speed, when said intended speed transient is detected;
and adjusting fuel flow to the engine according to the determined fuel-flow-rate setpoint.

2. A control method according to claim 1, including a step of detecting the end of a speed transient, which step comprises comparing a difference between said setpoint parameter and said operating parameter with a predetermined end transient threshold, implementation of the speed transient regulation loop being stopped in response to said step of detecting the end of a transient.

3. A control method according to claim 1, wherein said engine is a turbine engine having a high-pressure spool and a low-pressure spool, said speed being the speed of the high-pressure spool.

4. A control method according to claim 1, wherein said engine is a turbine engine presenting a high-pressure spool and a low-pressure spool, said speed being the speed of the low-pressure spool.

5. A control method according to claim 1, wherein said integration is initialized at the speed value that is current at the moment an intended transient is detected.

6. A control method according to claim 1, wherein the speed transient regulation loop includes a class 2 corrector.

7. A control method according to claim 1, wherein the speed transient regulation loop includes a direct action corrector suitable for determining a correction magnitude representing a flow rate variation that corresponds to the speed varying along the speed trajectory.

8. A computer program including instructions for executing steps of a control method according to claim 1 when said program is executed by a computer.

9. An electronic control unit for an engine, the control unit having a memory including instructions of a computer program according to claim 8.

10. An engine including an electronic unit according to claim 9.

* * * * *